Feb. 26, 1957  R. C. HAMILTON  2,782,602
ELECTRO-MECHANICAL SYNCHRONIZING APPARATUS
Filed Sept. 25, 1952
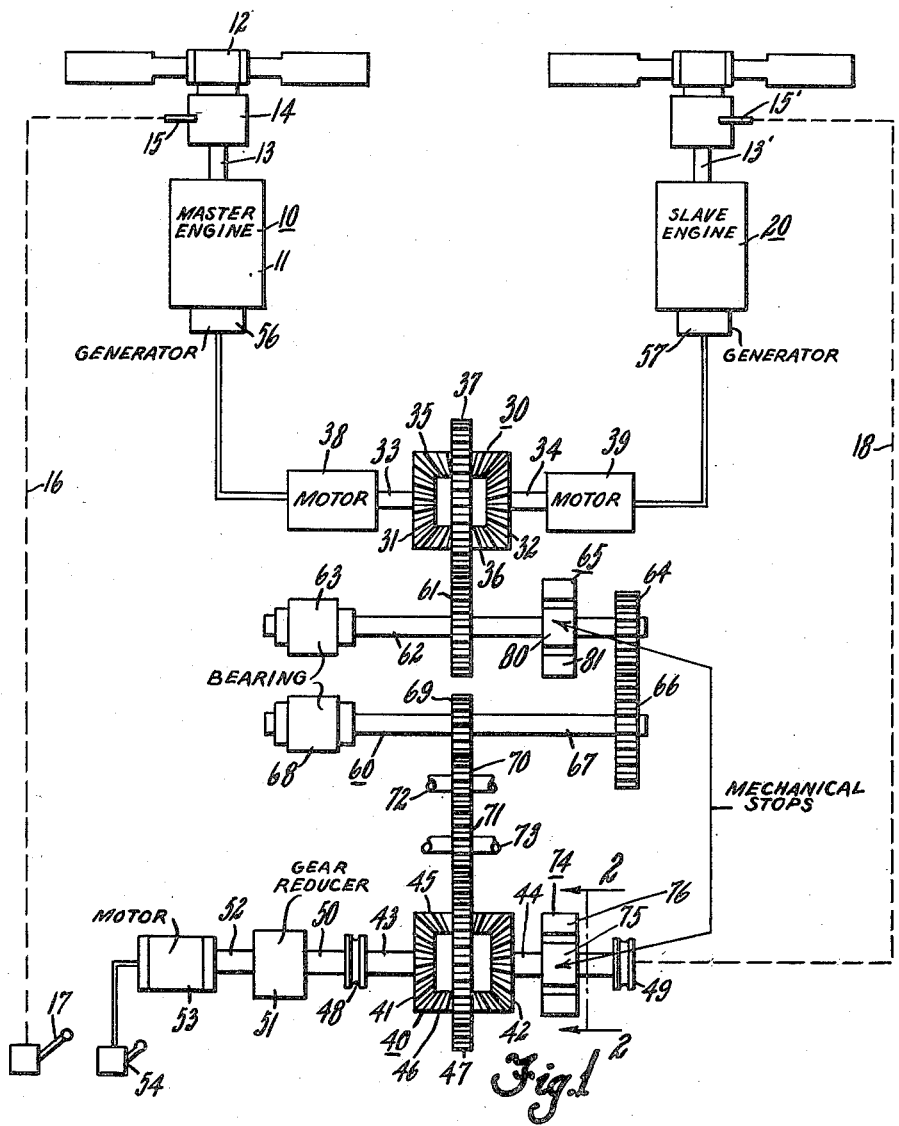
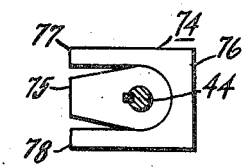
INVENTOR.
ROBERT C. HAMILTON
BY
HIS ATTORNEYS United States Patent Office 2,782,602
Patented Feb. 26, 1957

2,782,602

ELECTRO-MECHANICAL SYNCHRONIZING APPARATUS

Robert C. Hamilton, Dayton, Ohio, assignor to General Motors Corporation, Detroit, Mich., a corporation of Delaware Application September 25, 1952, Serial No. 311,354

6 Claims. (Cl. 60—97)

The present invention relates to mechanism for synchronizing the speeds of a plurality of engines, and has particular reference to electro-mechanical mechanism for maintaining aircraft engines in synchronous speed operation.

When two or more engine-propeller combinations are rotating at slightly different speeds, a vibration beat develops, the frequency of which is dependent upon the speed differences existent between the engines. To eliminate the detrimental effects of vibration beats in aircraft automatic synchronizer mechanisms are employed to maintain the engines in speed synchronization with each other. In addition the synchronizer mechanisms preferably include means for adjusting speeds of the engines independently. Accordingly, one of my objects is to provide a synchronizing mechanism having means permitting either manual or automatic speed control of the engines.

The aforementioned and other objects are generally accomplished in the present invention by providing means for adjusting or resetting speed sensitive governors associated with the pitch controlling mechanism of the several engine-propeller combinations. Specifically, the present invention employs mechanical error sensing and error correcting differentials. Opposite sides of the error sensing differential are driven at speeds commensurate with that of the engines in a twin-engine aircraft. However, the apparatus may be adapted for utilization on a multi-engine aircraft having more than two engines by driving one input gear of each error sensing differential unit from a master engine or from a master reference speed source, while the other input gear of each error sensing differential is driven by one of the controlled engines. The error sensing differential output is transmitted by the ring gear or spider thereof through an error correction limiting device to the ring gear of the error correcting mechanical differential.

The error correction limiting device is employed as a safety feature enabling the pilot to be cognizant at all times of the approximate position of a regulator control lever, which adjusts the governor speed setting. In the instant disclosure only limited synchronization error correction is available, the limits of which are defined by stops, in order that malfunctions of the synchronizer will not materially effect propeller control. The error correction limiting device includes mechanical stops which allow only limited movement of the error sensing differential ring gear. As opposite sides of the error sensing differential are driven by synchronous motors, which are designed to have continuous stall characteristics, engagement of the stops will preclude movement of the error sensing differential unit. Combined movement limit stops are also provided in conjunction with the error sensing differential for a reason which will later appear.

The speed of each engine may be adjusted manually through resetting of the governor associated therewith. This result is achieved by providing means for actuating the regulator lever of the controlled engine through the error correcting differential embodying a ring gear operatively associated with the output of the error sensing differential through the correction limiting device. Opposite sides of the error correcting differential are connected respectively to the regulator lever and a manual control mechanism. In this manner the regulator lever and, perforce, the speed setting of the controlled engine may be adjusted either automatically by the error sensing differential through movement of the ring gear, or manually through one side of the differential by a manual control mechanism. As disclosed, the master engine governor may be reset or adjusted manually through a manual control having a mechanical connection with the regulator lever thereof.

Further objects and advantages of the present invention will be apparent from the following description, reference being had to the accompanying drawing wherein a preferred embodiment of the present invention is clearly shown.

In the drawing:

Fig. 1 is a schematic view of synchronizing mechanism constructed according to the present invention.

Fig. 2 is a sectional view taken along line 2—2 of Fig. 1.

Although the present invention is exemplified in conjunction with a twin-engine aircraft wherein one of the propeller-engine combinations is employed as a master speed source, it is to be understood that departure therefrom is within the scope of this invention. Accordingly, a standard reference speed source may be employed and the apparatus disclosed may be adapted to a multi-engine aircraft having more than two engines. Referring particularly to the drawing, a master engine-propeller combination is indicated by the numeral 10 and a controlled engine-propeller combination is indicated by the numeral 20. As each engine-propeller combination is a duplicate of the other, it is deemed sufficient to describe only one in detail. The engine-propeller combinations are generally of the type disclosed in the copending application, Serial No. 94,944, filed May 24, 1949, in the name of James W. Light et al., now Pat. No. 2,673,309, in which an engine 11 drives a propeller unit 12 through a shaft 13. Corresponding parts of the controlled engine-propeller combination are indicated by like numbers with primes affixed. The propeller unit 12 is of the variable pitch type, the pitch of which is automatically controlled by the distribution of fluid under pressure from a regulator 14, which is connected to and rotates with the propeller. Protruding from the regulator casing is a regulator control lever 15. The regulator lever 15 is operatively connected with a governor, not shown, disposed within a regulator, and movements of the regulator lever will adjust the speed setting of the governor. The governor disposed within the regulator may, for example, be of the centrifugally actuated type.

The regulator lever 15 of the master engine-propeller combination 10 is connected by mechanical linkage 16 to a pilot speed control lever 17. The regulator lever 15' of the control engine-propeller combination 20 is connected by means of a mechanical linkage 18 to the output side of an error correcting mechanical differential unit 40. The error correcting differential unit 40 comprises a pair of spaced bevel gears 41 and 42 attached to shafts 43 and 44, respectively. The two bevel gears 41 and 42 mesh with two common idler bevel gears 45 and 46, whose shafts, not shown, are mounted in a differential ring gear 47. The differential unit 40 is of conventional design and construction and, per se, forms no part of the present invention. The differential ring gear 47 is operatively connected to an error correction limiting device designated generally by the numeral 60, which will later be described. Shafts 43 and 44 of the differential unit 40 have attached thereto pulleys 48 and 49, respectively. As will be apparent to those familiar with the operation of mechanical differential units, if the ring gear 47 is held stationary, any movement experienced by pulley 48 and bevel gear 41 will be followed instantly and accurately within the backlash limits of the differential by the bevel gear 42 and the pulley 49. When the pulley 48 and the bevel gear 41 are held stationary, movement of the bevel gear 42 and the pulley 49 may be accomplished through rotation of the differential ring gear 47. The pulley 48 is connected by means of cable 50 to the output of a gear reducing unit 51, the input of which is connected by a shaft 52 to a reversible electric motor 53. Energization of the reversible electric motor 53 is under the control of a switch 54, which may be manually actuated by the pilot. In this manner the pilot can manually adjust the position of the regulator lever 15' on the controlled engine-propeller combination 20 to select the speed of operation thereof through the error correcting differential 40, when the differential ring gear 47 thereof is held stationary.

The error correction limiting device 60 is also operatively connected with an error sensing mechanical differential unit 30. The error sensing differential unit 30 is similar in construction to that of the error correcting differential unit 40 and comprises a pair of input bevel gears 31 and 32 mounted on shafts 33 and 34, respectively. The gears 31 and 32 mesh with two common idler bevel gears 35 and 36, whose shafts, not shown, are mounted in a differential ring gear 37. The shafts 33 and 34 are operatively connected with the propeller units 10 and 20, respectively, by means to be later described, whereby the rotative speeds of gears 31 and 32 will be commensurate with that of the shafts 13 and 13'.

It will be understood that in accordance with the principles of operation of differential gearings, so long as gears 31 and 32 turn at equal angular velocities in opposite directions, the gears 35 and 36 will turn idly about their shafts, not shown, and the differential ring gear 37 will remain stationary. Any suitable means are interposed in the connection between the shafts 33 and 34 and the propeller units 10 and 20 to obtain rotation of the gears 33 and 34 in opposite directions. If there is a difference between the angular velocities of the shafts 33 and 34 and, accordingly, the gears 31 and 32, rotary movement will be imparted to differential ring gear 37 proportionate to the aforementioned difference in velocity. Accordingly, if the shaft 33 and the gear 31 are rotating more rapidly than the shaft 34 and the gear 32, the increment in angular velocity imparted to idler gears 35 and 36 by gear 31 will be compensated for by turning of the ring gear 37 at a rate equal to one-half of the angular velocity difference between gears 31 and 32 in one direction. If on the other hand, the rotary velocity of gear 32 exceeds that of gear 31, the ring gear 37 will likewise turn proportionally to the difference in angular velocity but in the opposite direction.

In the present invention shafts 33 and 34 are driven by synchronous motors 38 and 39, respectively. The synchronous motors are designed and constructed for continuous stalled operation without any harm ensuing thereto. The synchronous motors 38 and 39 are energized by synchronous generators 56 and 57 driven, respectively, by the master unit 10 and the controlled unit 20. The differential ring gear 37 meshes with a spur gear 61 forming part of the error correcting limiting device 60. The spur gear 61 is attached to a shaft 62 supported by bearing means 63. One end of the shaft has attached thereto a spur gear 64, and disposed between the spur gear 64 and spur gear 61 is a mechanical stop device 65, to be later described. The spur gear 64 meshes with a spur gear 66 drivingly attached to a shaft 67, journaled and supported within bearing means 68. The shaft 67 has attached thereto a second spur gear 69 having driving engagement with the differential ring gear 47 of the error differential unit 40 through the medium of a pair of gears 70 and 71 supported by shafts 72 and 73, respectively.

Interposed between the bevel gear 42 of the differential unit 40 and the pulley 49, is a second mechanical stop device 74. As the mechanical stop devices 65 and 74 are of identical construction, a description of one is deemed sufficient. Referring more particularly to Fig. 2, the shaft 44 has attached thereto a horseshoe-shaped lug 75 surrounded by a member 76. As is readily apparent, shaft 44 is only permitted to move through a relatively small arcuate distance before the member 75 will engage one of the legs 77 or 78 of the member 76, thereby preventing further movement of the shaft 44. The stop device 65 is of similar construction and includes a lug member 80 cooperable with a stop member 81.

In the present invention the synchronizer is designed to supply only a limited synchronization error correction so that the pilot will know the approximate position of the control lever 15' at all times, as hereinbefore mentioned. That is, when the algebraic summation of the speed errors exceeds a predetermined amount, i. e. the time integral thereof, for example ±75 R. P. M., automatic speed correction is precluded. The limited arcuate movement provided by the mechanical stop device 65 is designed to correspond with the design limited correction and upon engagement of the lug 80 with either of the stops provided by the member 81, the motors 38 and 39 associated with the error sensing differential 30 will be stalled. Accordingly, no movement will be transmitted to the differential ring gear 47 and the pilot may adjust the speed setting of the controlled engine governor manually by energizing motor 53 under manual actuation of the switch 54. However, when the speed of unit 20 is within 75 R. P. M. of the master unit 10, either above or below, movement of the ring gear 37 of the differential unit 30 will be transmitted through the gear reduction and effect movement of the ring gear 47 of the differential unit 40 whereupon the regulator lever 15' of the controlled unit 20 will be adjusted and the governor thereof will be reset to automatically bring the speeds of the units 10 and 20 back into synchronism.

In apparatus of the character disclosed wherein the governor is reset by movement of a regulator control lever, some provision must be made to limit both automatic and manual movement of the lever beyond its limits of travel. In the present invention the mechanical stop device 74 is employed. Thus, the arcuate movement permitted shaft 44 by the stop device 74 corresponds to the physical travel limits of the regulator lever 15. Thus, the stop unit 74 forms a total combined movement limit stop device for shaft 44, under either manual or automatic control.

In operation the error sensing differential will automatically apply a correction through the error correction limiting device to the error correcting differential and, thence, to the controlled propeller unit when the speed difference between the units 10 and 20 is within the predetermined established limits. However, if the speed difference between the units 10 and 20 exceeds that of the predetermined automatic correction limits, the pilot may manually adjust the speed of either unit 10 or 20 to bring the speeds back into the range of automatic synchronization.

The apparatus disclosed is of relatively simple design and is extremely reliable. Flexibility is provided in that both of the engine-propeller units may be controlled manually to bring the speeds thereof within the range of automatic synchronization. Moreover, the disclosed embodiment may be modified for use upon a multi-engine aircraft having more than two engines by driving one of the input gears of the error sensing differential from a common reference speed source while driving the other input gear of each differential at a speed commensurate with that of the controlled propeller engine combinations. In this type of arrangement the speed of each controlled engine may be varied manually through the error correcting mechanical differential in a manner similar to that described in connection with a twin-engine craft. Either engine governor may be reset manually in either direction at any time whether or not an automatic error correction is being applied to the controlled engine.

While the embodiment of the present invention as herein disclosed, constitutes a preferred form, it is to be understood that other forms might be adopted.

What is claimed is as follows:

1. In a mechanism for synchronizing the speed of a controlled engine with the speed of a master engine, a first differential mechanism disposed between said engines and having its opposite sides driven by said engines, a first displaceable member associated with said first differential mechanism to be displaced thereby upon a variation in the speed of the controlled engine with respect to the speed of the master engine, a second differential mechanism disposed between said first displaceable member and said controlled engine, said second differential mechanism having a second displaceable element operatively connected to said first displaceable element to be displaced thereby, the opposite sides of said second differential mechanism being operatively connected to a manual control and the governor of said controlled engine respectively, whereby the governor of said controlled engine may be adjusted manually through opposite sides of said second differential mechanism or automatically through said second displaceable member and one side of said second differential mechanism, and means including mechanical stops in the operative connection between said first and second displaceable members for positively stopping said first displaceable member when the speed of the controlled engine differs from the speed of the master engine by more than a predetermined amount.

2. In a mechanism for synchronizing the speed of a controlled engine with the speed of a master engine, a first differential mechanism disposed between said engines and having its opposite sides driven by said engines, a first displaceable member associated with said first differential mechanism to be displaced thereby upon a variation in the speed of the controlled engine with respect to the speed of the master engine, a second differential mechanism disposed between said first displaceable member and said controlled engine, said second differential mechanism having a second displaceable element operatively connected to said first displaceable element to be displaced thereby, the opposite sides of said second differential mechanism being operatively connected to a manual control and the governor of said controlled engine respectively, whereby the governor of said controlled engine may be adjusted manually through opposite sides of said second differential mechanism or automatically through said second displaceable member and one side of said second differential mechanism, and means including mechanical stops interposed between said one side of said second differential mechanism and the governor of said controlled engine for establishing a range of adjustment of said controlled engine governor by both manual and automatic control.

3. In a mechanism for synchronizing the speed of a controlled engine with the speed of a master enigne, a first differential mechanism disposed between said engines and having its opposite sides driven by said engines, a first displaceable member associated with said first differential mechanism to be displaced thereby upon a variation in the speed of the controlled engine with respect to the speed of the master engine, a second differential mechanism disposed between said first displaceable member and said controlled engine, said second differential mechanism having a second displaceable element operatively connected to said first displaceable element to be displaced thereby, the opposite sides of said second differential mechanism being operatively connected to a manual control and the governor of said controlled engine respectively, whereby the governor of said controlled engine may be adjusted manually through opposite sides of said second differential mechanism or automatically through said second displaceable member and one side of said second differential mechanism, means including mechanical stops in the operative connection between said first and second displaceable members for positively stopping said first displaceable member when the speed of the controlled engine differs from the speed of the master engine by more than a predetermined amount, and means including mechanical stops interposed between one side of said second differential mechanism and the governor of said controlled engine for establishing a range of adjustment of said controlled engine governor by both manual and automatic control.

4. Mechanical mechanism for synchronizing the speed of a controlled engine with that of a master engine including, means for comparing the speeds of said engines, an element displaced upon variation in the speed of said controlled engine with respect to the speed of said master engine, governor means for each engine, a manual control for each governor means, a differential mechanism interposed between said displaceable element and the governor of said controlled engine and having a displaceable member operatively connected with said displaceable element, the opposite sides of said differential mechanism being connected to the manual control for said controlled engine and the governor means of said controlled engine respectively, whereby the governor means of said controlled engine may be adjusted manually through opposite sides of said differential mechanism or automatically through said displaceable member under the control of said displaceable element and one side of said mechanical differential, and means interposed between one side of said differential mechanism and the governor means of said controlled engine and defining a range of adjustment thereof under either manual or automatic control.

5. In a mechanism for synchronizing the individual engine speed of a multi-engine aircraft with a master engine reference source, a governor associated with each engine, a manual control for each governor, means for comparing the speed of each individual engine with the master reference source, an element for each individual engine displaced upon variation in the speed of its respective engine from the speed of the master reference source, a differential mechanism interposed between each displaceable element and the governor of each individual engine and having a displaceable member operatively connected with one of said displaceable elements, the opposite sides of each differential mechanism being connected to the manual control for its respective engine and the governor for its respective engine whereby the governor of each individual engine may be adjusted manually through opposite sides of its respective mechanical differential or automatically through the displaceable member and one side of its respective mechanical differential, and means interposed between said one side of each mechanical differential and the governor of each individual engine for establishing a range of governor adjustment under either automatic or manual control.

6. In a mechanism for synchronizing the speed of a controlled engine with the speed of a master engine, a governor for controlling the speed of each engine, a manual control for each governor, a differential mechanism disposed between said engines and having its opposite sides driven by said engines, a displaceable member operatively connected with the governor of said controlled engine and associated with said differential mechanism to be displaced thereby upon a variation in the speed of the controlled engine with respect to the speed of the master engine, an output element connected with said differential mechanism, means including first mechanical stops connected between said differential mechanism and said output element, and means including second mechanical stops operatively connected between said output element and said displaceable member, said second mechanical stops controlling a range of adjustment of the governor of the controlled engine under manual control as well as automatic synchronization correction by said differential mechanism.

References Cited in the file of this patent

UNITED STATES PATENTS

| | | |
|---|---|---|
| 1,368,755 | Roddey | Feb. 15, 1921 |
| 1,465,091 | Prince | Aug. 14, 1923 |
| 1,886,975 | Profitlich | Nov. 8, 1932 |
| 2,003,558 | Schmidt | June 4, 1935 |
| 2,054,908 | Moore | Sept. 22, 1936 |
| 2,105,089 | Martin | Jan. 11, 1938 |
| 2,144,429 | Martin | Jan. 17, 1939 |
| 2,252,545 | Benz | Aug. 12, 1941 |
| 2,268,230 | Warner | Dec. 30, 1941 |
| 2,307,334 | Peek | Jan. 5, 1943 |
| 2,399,685 | McCoy | May 7, 1946 |
| 2,400,579 | Wahlberg | May 21, 1946 |